(12) United States Patent
Mishler

(10) Patent No.: US 6,495,935 B1
(45) Date of Patent: Dec. 17, 2002

(54) LINEAR MOTOR DRIVE UNIT

(75) Inventor: Mike Mishler, Schaumburg, IL (US)

(73) Assignees: THK Co., LTD, Tokyo (JP); THK America, Inc., Schaumburg, IL (US)

( * ) Notice: Subject to any disclaimer, the term of this patent is extended or adjusted under 35 U.S.C. 154(b) by 55 days.

(21) Appl. No.: 09/692,159

(22) Filed: Oct. 20, 2000

(51) Int. Cl.$^7$ ............................................ H02K 41/00
(52) U.S. Cl. ........................................ 310/12; 384/59
(58) Field of Search .............................. 310/12, 42, 90; 384/45, 59

(56) References Cited

U.S. PATENT DOCUMENTS

| | | | |
|---|---|---|---|
| 3,707,924 A | * 1/1973 | Barthalon et al. | 104/290 |
| 4,879,482 A | * 11/1989 | Murofushi | 310/12 |
| 5,225,725 A | * 7/1993 | Shiraki et al. | 310/12 |
| 5,924,518 A | * 7/1999 | D'Onofrio | 310/12 X |
| 6,054,783 A | * 4/2000 | Philipp et al. | 310/12 |
| 6,326,708 B1 | * 12/2001 | Tsuboi et al. | 310/12 |
| 6,336,744 B1 | * 1/2002 | Rehm et al. | 384/59 |

FOREIGN PATENT DOCUMENTS

| | | | |
|---|---|---|---|
| JP | 355083452 A | * | 6/1980 |
| JP | 405252725 A | * | 9/1993 |

OTHER PUBLICATIONS

Abstract of Japanese Patent Publ. No. 03007055A; dated Jan. 14, 1991.
Abstract of Japanese Patent Publ. No. 07–083228; dated Mar. 28, 1995.

* cited by examiner

*Primary Examiner*—Nestor Ramirez
*Assistant Examiner*—Judson H. Jones
(74) *Attorney, Agent, or Firm*—Arent Fox Kintner Plotkin & Kahn PLLC

(57) ABSTRACT

A linear motor drive unit which is connected to a movable body supported movably on a stationary portion such as a head, like a work table and the like of a machine table for instance, and which drives such a movable body in reciprocation while giving a predetermined movement amount to it. The linear motor drive unit comprises a base plate, a magnet plate provided on the base plate, a top plate having a face for attaching the movable body, a movable element fixed to the top plate and facing the magnet plate, one pair of track rails provided on the base plate along both sides of the magnet plate, and slide members fixed to the top plate along both sides of the movable element and moving on the track rails, and the track rails and the slide members are constituted so as to be able to freely divide in a direction along which the movable element is separated from the magnet plate.

3 Claims, 6 Drawing Sheets

F I G. 7
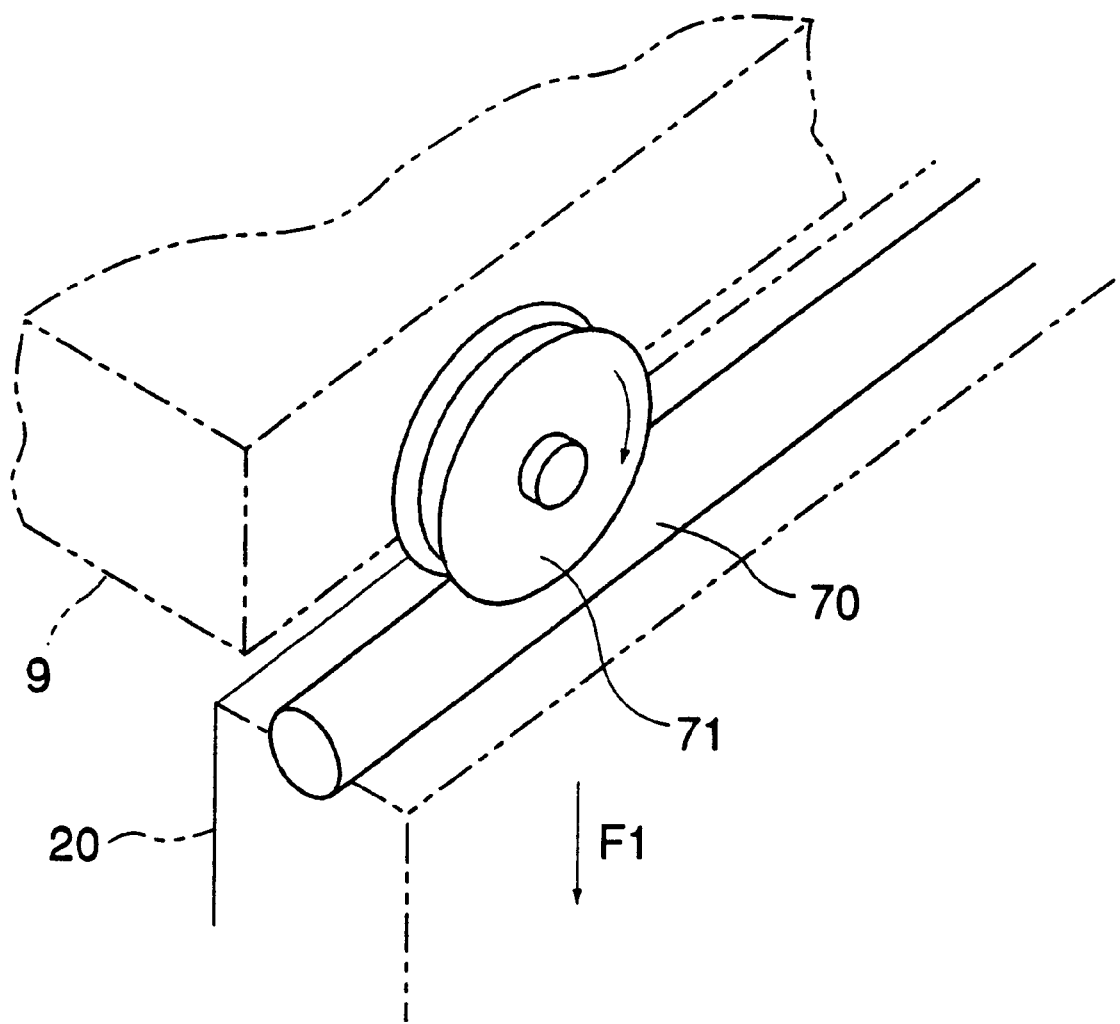

LINEAR MOTOR DRIVE UNIT

BACKGROUND OF THE INVENTION

1. Field of the Invention

The present invention relates to a linear motor drive unit which is connected to a movable body supported movably on a stationary portion such as a head, like a work table and the like of a machine tool for instance, and which drives such a movable body in reciprocation while giving a predetermined movement amount to it.

2. Description of the Related Art

In various tables of the machine tool, a travelling portion of an industrial robot, various carrier apparatuses and the like, it is required to linearly guide the movable body on the stationary portion such as head and column, and position it to a predetermined position. Hitherto, as such a guide structure of the movable body, one shown in FIG. 6 is generally well known. Concretely, it is constituted such that a movable body 102 is supported by arranging one pair of linear guide units 101, 101 on a stationary portion 100, a ball screw 103 is disposed below the movable body 102, and the ball screw 103 is driven by a rotary motor 104. The linear guide unit 101 is composed of a track rail 105 incorporated through balls, and slide blocks 106. Accordingly, by fixing the track rails 105 to the stationary portion 100 and the slide blocks 106 to the movable body 102, it becomes possible to freely guide the movable body 102 on the stationary portion 100 along the track rails 105. Further, the ball screw 103 is one in which a screw shaft 107 meshes with a nut member (not shown in the drawing) through balls and the nut member is fixed to the movable body 102, while the screw shaft 107 is provided rotatively and parallel to the track rails 105 of the linear guide units 101. Therefore, it is adapted such that if the screw shaft 107 is rotated by the rotary motor 104, the nut member is moved on the screw shaft 107 in compliance with rotations of the rotary motor 104 to thereby give a thrust in a direction along the track rails 105 to the movable body 102 and, further, the movable body 102 can be stopped at a predetermined position.

In order to accurately position the movable body on the stationary portion by using the ball screw in this manner, it is required to suitably control a rotational speed and a rotational amount of the rotary motor. However, a precision rotary motor unitized with an encoder being stored and a feedback control function being provided is supplied in a market in various kinds. Accordingly, a person who intends to construct the aforesaid guide structure can very easily construct it merely by purchasing that precision rotary motor, installing it to the stationary portion, and connecting it to the screw shaft through a coupling.

On the other hand, in recent years, also a guide structure in which the movable body is directly driven by using a linear motor without using the ball screw becomes increased. However, different from the rotary motor in which a stator and a rotor are integrated within a casing, magnet plates and coils are under a separated state in the linear motor, so that there arises a necessity to individually fix the magnet plates to the stationary portion and the coils to the movable body. That is, the linear motor is not traded under a state that the magnet plates and the coils are integrated, so that a handling after the purchase is very troublesome. Especially, since it is required that the magnet plate and the coil are faced each other with a very small predetermined gap, in case where these magnet plate and coil are individually handled, a work for attaching them requires much labor, and such a trouble that the magnet plate is brought into contact with the coil to thereby damage them and such an accident that a hand is nipped between the magnet plate and the coil are liable to occur.

Further, also a linear encoder for detecting a movement amount of the coil with respect to the magnet plate is completely separately traded and, in order to realize the feedback control function, it is necessary to purchase the linear encoder separately from the linear motor and incorporate it to the stationary portion and the movable body. And, when completely individually incorporating the magnet plate, the coil and the linear encoder in this manner, a constant accuracy is required for every attaching work, so that the work becomes very troublesome.

Also a linear motor in which these magnet plate, coil and linear encoder are completely unitized exists in the market, but such a linear motor is directed to a specified use, so that a room for improving it in compliance with required conditions scarcely exists.

SUMMARY OF THE INVENTION

The invention has been made in view of such problems, and its object is to provide a linear motor drive unit capable of being easily and safely attached as a drive source of various guide structures, and capable of being flexibly applied to required uses.

In order to achieve the above object, the invention provides a linear motor drive unit attached to a movable body linearly movable with respect to a stationary portion and used for the purpose of giving a thrust to the movable body, comprising: a long base plate; a magnet plate which is provided on the base plate, and in which plural magnetic poles are arranged at a predetermined pitch along a longitudinal direction of the base plate; a top plate having a face for attaching the movable body; a movable element fixed to the top plate and facing the magnet plate; one pair of track rails provided on the base plate along both sides of the magnet plate; and slide members fixed to the top plate along both sides of the movable element and moving on the track rails while keeping an un-contact state between the movable element and the magnet plate; characterized in that the track rails and the slide members are constituted so as to be able to freely divide in a direction along which the movable element is separated from the magnet plate.

According to such a technical means, since the magnet plate is fixed to the base plate, while the movable element is fixed to the top plate and, moreover, since the top plate is incorporated to the base plate through the slide members and the track rails, it becomes possible to handle the magnet plate and the movable element as an integrated one in which they are unitized. Therefore, a work for attaching the magnet plate and the movable element to the stationary portion and the movable body can be easily performed, so that it become possible to avoid such troubles that, during such a work, the magnet plate is damaged and a hand is nipped between the magnet plate and the movable element. That is, since the track rails and the slide members are constituted so as to be able to divide in a direction along which the movable element is separated from the magnet plate, by inserting the linear motor drive unit of the invention to a lower side of the movable body supported movably by linear guide units, and fixing respectively the base plate to the stationary portion and the top plate to the movable body, the magnet plate and the movable element can be easily faced with a predetermined gap.

Further, it is also possible to incorporate a linear encoder between the base plate and the top plate and, in case of being constituted in such a manner, since the linear motor and the linear encoder can be handled as an integrated one in which they are unitized, it becomes also possible to construct easily and within a short time a guide structure having a feedback control function.

Accordingly, the linear motor drive unit of the invention can be easily applied to a wide use, and it becomes possible to intend to reduce a cost by mass production.

Further, in regard to a limited use, it is also possible to use the top plate as a table as it is. In this case, since it results in the fact that a magnetic force applied between the magnet plate and the movable element gives a pre-load between the track rail and the slide member, it becomes possible, in a range not impairing such a pre-load, to use the top plate as the table.

BRIEF DESCRIPTION OF THE DRAWINGS

FIG. 7 is a perspective view showing another example of the linear guide.

DETAILED DESCRIPTION OF THE PREFERRED EMBODIMENT

Hereunder, a linear motor drive unit of the invention is explained in detail on the basis of the attached drawings.

Figure 1:
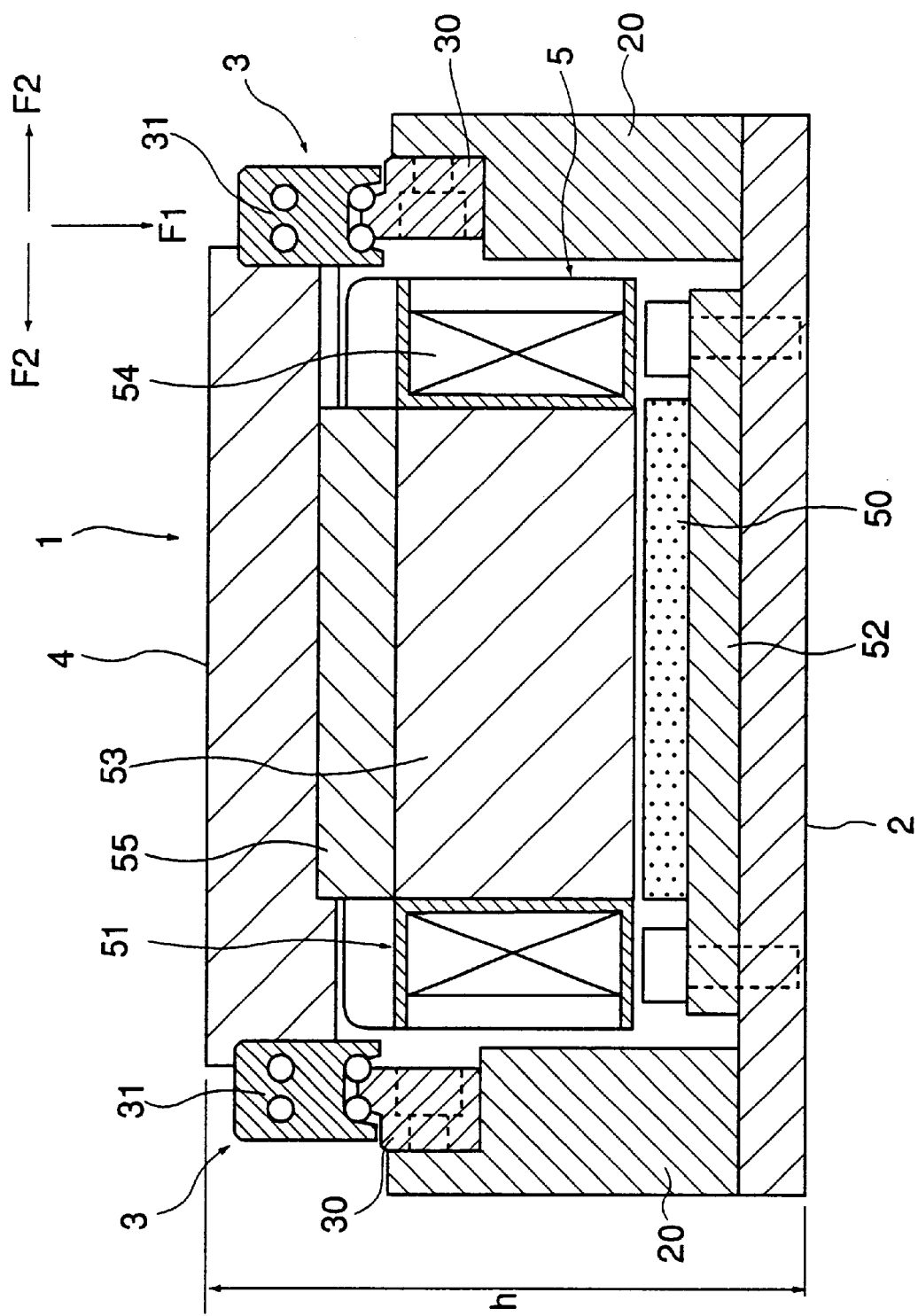
FIG. 1 is a front sectional view showing an embodiment of a linear motor drive unit of the invention.

FIG. 1 is a front sectional view showing a linear motor drive unit 1 to which the invention is applied. The linear drive unit 1 is constituted such that a top plate 4 is movably supported on a long base plate 2 through one pair of linear guides 3 and a linear servomotor 5 is provided between the base plate 2 and the top plate 4 to thereby give a thrust to the top plate 4.

Figure 2:
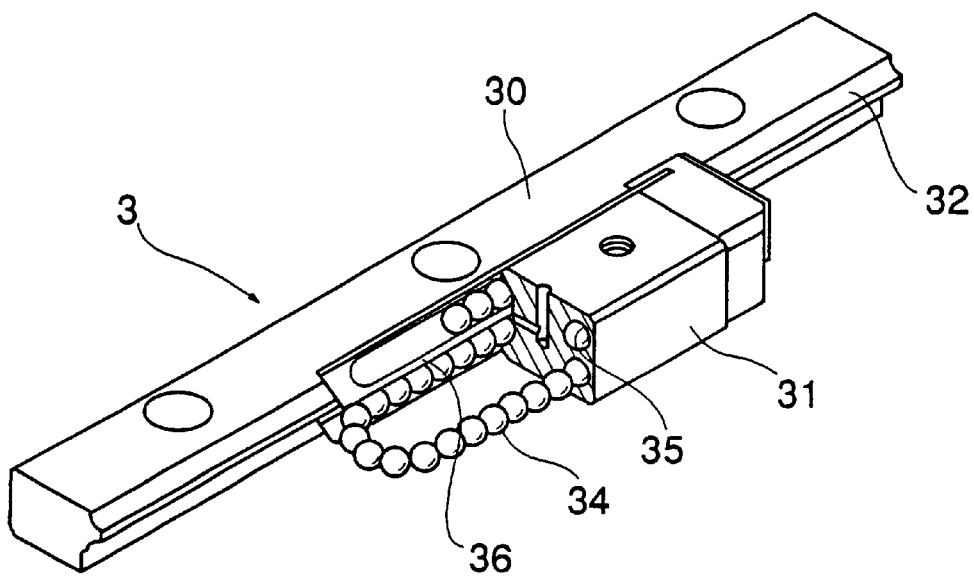
FIG. 2 is a perspective view showing one example of a linear guide used in the linear motor drive unit according to the embodiment.
Figure 3:
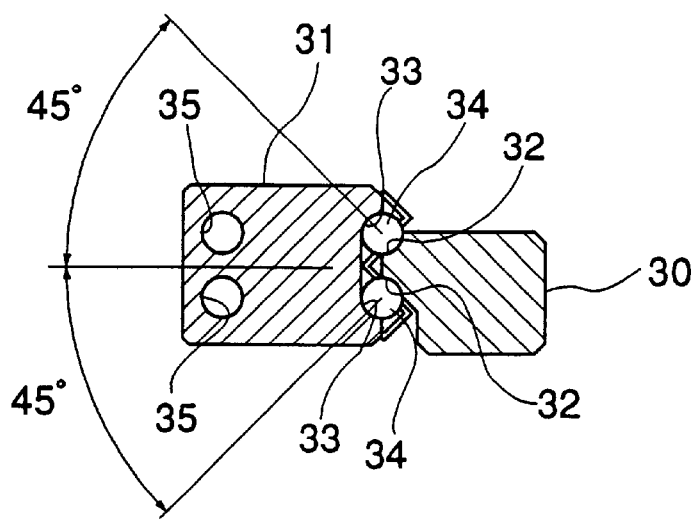
FIG. 3 is a sectional view showing one example of the linear guide used in the linear motor drive unit according to the embodiment.

FIG. 2 and FIG. 3 are a perspective view and a front sectional view, respectively showing details of a constitution of the linear guide 3. The linear guide 3 is composed of a track rail 30 arranged along a longitudinal direction of the base plate 2, and a slide member 31 moving along the track rail 30 and fixed to the top plate 4. The track rail 30 is formed in an approximately rectangular shape in its section perpendicular to a longitudinal direction and, in its one side face along the longitudinal direction, two ball rolling faces 32 are formed toward a direction mutually diverging at 90°. On the other hand, in a side face of the slide member 31, two load rolling faces 33 facing the ball rolling faces 32 of the track rail 30 are formed, and it is adapted such that many balls 34 roll between the ball rolling faces 32 of the track rail 30 and the load rolling faces 33 of the slide member 31 while bearing a load. Further, it is constituted such that a ball endless track 35 for circulating the balls 34 having finished rolling on the load rolling face 33 is formed in the slide member 31, so that the slide member 31 can be continuously moved by the fact that the balls 34 are endlessly circulated. Incidentally, in FIG. 2 and FIG. 3, a reference numeral 36 denotes a retainer, and it prevents the balls 34 from rolling down from the load rolling faces 33 of the slide member 31 when the slide member 31 is separated from the track rail 30.

As shown in FIG. 1, one pair of standoffs 20, 20 are provided in both side edge portions of the base plate 2 along the longitudinal direction, and the track rails 30 are respectively fixed to each standoff 20 by bolts. On the other hand, the slide members 31 are fixed to both side edge portions of the top plate 4 while corresponding to each track rail 30, and the top plate 4 is provided so as to span between the one pair of standoffs 20, 20. Here, each track rail 30 is fixed to the standoff 20 with its face formed with the ball rolling faces 32 being directed upward, while each slide member 31 is fixed to the top plate 4 with its side face formed with the load rolling faces 33 being directed downward, and the slide member 31 is incorporated to the track rail 30 from above (upper side of a paper of FIG. 1). Accordingly, the ball rolling faces 32 of the track rail 30 contact with the balls 34 at 45° upwardly with respect to a horizontal direction (left and right direction of the paper of FIG. 1), while the load rolling faces 33 of the slide member 31 contact with the balls 34 at 45° downwardly with respect to the horizontal direction, and it is adapted such that the linear guide 3 constituted by the track rail 30 and the slide member 31 bears only a vertically downward load F1 applied to the top plate 4 and a load F2 applied in the horizontal direction. That is, the top plate 4 is supported on the base plate 2 by the linear guides 3 and freely movable while bearing the loads F1 and F2, whereas it is adapted so as to be able to separate from the base plate 2 when a vertically upward load is applied thereto.

Further, the linear servomotor motor 5 is provided between the top plate 4 and the base plate 2, and it is constituted such that the top plate 4 is moved on the base plate 2 by the thrust and a holding force, which are generated by the linear servomotor 5, and can be stopped at a predetermined position on the base plate 2. The linear servomotor 5 is composed of a magnet plate 50 fixed to the base plate 2 side, and a movable element 51 fixed to the top plate 4 side. A bolster 52 is fixed onto the base plate 2 so as to be put between the standoffs 20, and the magnet plate 50 is disposed on the bolster 52. Further, in the magnet plate 50, plural magnetic poles are magnetized at a predetermined pitch along the longitudinal direction of the base plate 2, and these magnetic poles are arranged such that an N pole and an S pole exist alternately. On the other hand, the movable element 51 is constituted by repeatedly arranging plural coil assemblies along a moving direction of the top plate 4, and each coil assembly is constituted by winding a coil 54 around an exciting core 53. And, each coil assembly is fixed to a lower face of the top plate 4 through a yoke 55, and an arrangement pitch between the mutually adjoining coil assemblies is the same as that between the magnetic poles in the magnet plate 50.

Figure 4:
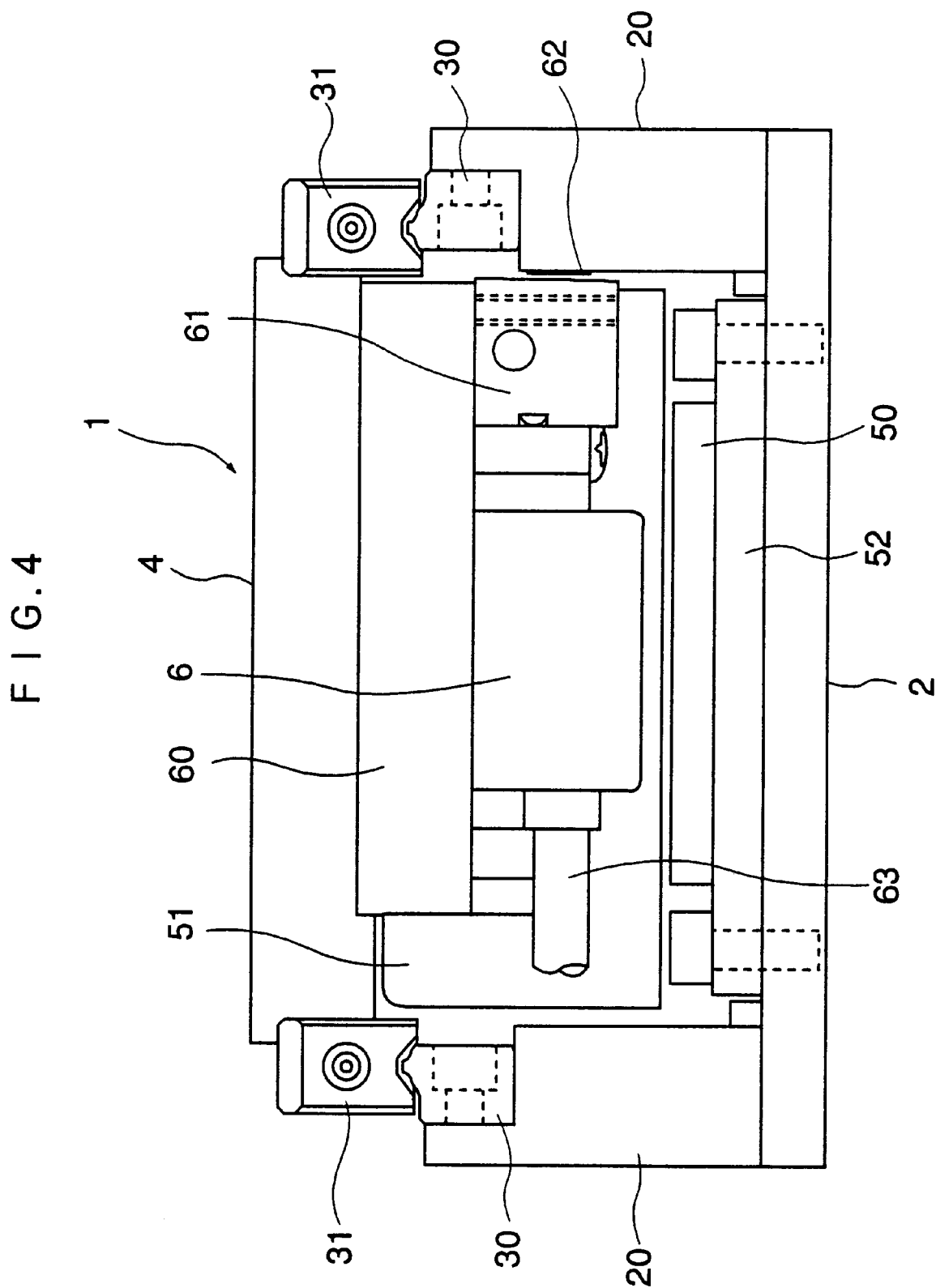
FIG. 4 is a front view of the linear motor drive unit according to the embodiment.

Further, as shown in FIG. 4, in the linear motor drive unit 1, a Hall sensor 6 is fixed to the top plate 4 through a bracket 60, and it faces the magnet plate 50 fixed to the base plate 2 with a predetermined interval being kept between them. Since the Hall sensor 6 generates a signal complying with a change in magnetic flux density, if the top plate 4 moves on the base plate 2 along the track rails 30, it generates a signal in compliance with the intensity of a magnetic field generated by the magnetic pole of the magnet plate 50. Accordingly, by controlling, on the basis of this signal of the Hall element 6, a timing of power supply for each coil assembly, a magnetic attraction force is generated between a tip of the exciting core 53 and the magnetic pole of the magnet plate 50, so that it becomes possible to continuously give a thrust along the longitudinal direction of the base plate 2 to the top plate 4, while it becomes possible to give a holding force for binding the top plate 4 to one place on the base plate 2.

Additionally, a reading section 61 of optical type linear encoder is fixed to the bracket 60, and the reading section 61 faces an encoder tape 62 adhered on a side face of the standoff 20 along the longitudinal of the track rail 30. Accordingly, it is adapted such that, if the top plate 4 moves on the base plate 2 along the track rails 30, the reading section 61 counts light and dark stripes formed in the encoder tape 62 at predetermined pitches and, on the basis of such a counted value, a movement amount of the top plate 4 with respect to the base plate 2 can be grasped. Incidentally, a reference numeral 63 in FIG. 4 denotes a cable for transmitting signals from the Hall sensor 6 and the reading section 61 to a control section outside the drawing and supplying an electric power to the movable element 51. Further, the linear encoder composed of the reading section 61 and the encoder tape 62 is not limited to the optical type one, and may be a magnetic type one for reading the magnetism of a magnet scale.

And, the linear motor drive unit 1 of this embodiment constituted as mentioned above is arranged, for example as shown in FIG. 5, in the lower face side of a movable body 9 guided on a stationary portion 8 by another linear guides 7, 7, and is used as drive means of the movable body 9. That is, the linear motor drive unit 1 is used with its base plate 2 being fixed to the stationary portion 8 and its top plate 4 to the movable body 9. Further, the longitudinal direction of the base plate 2 is set parallel to a moving direction of the movable body 9 by the guide units 7. And, under this state by supplying the electric power to each coil assembly constituting the movable element 51, a thrust given to the top plate 4 is transmitted to the movable body 9, so that it is possible to move the movable body 9 on the stationary portion 8 by an optional amount and, further, hold it to a predetermined position.

In such a using method, if a height H from the stationary portion 8 to the movable body 9 is set slightly larger (for example, by about 0.1 mm) than a height h (refer to FIG. 1) of the linear motor drive unit 1 of this embodiment, a state in which the slide member 31 slightly floats from the track rail 30 is obtained by the fact that the top plate 4 is fixed to the movable body 9, so that it follows that the movable body 9 is guided on the stationary portion 8 only by the linear guides 7 supporting the movable body 9. Therefore, even if a guide direction of the top plate 4 by the linear motor drive unit 1 does not strictly agree with that of the movable body 9 on the stationary portion 8, it is possible to lightly drive the movable body 9 without applying a large resistance to the movement of the movable body 9. In other words, if the height H of the movable body 9 is set slightly larger than the height h of the linear motor drive unit 1, an incorporation of the linear motor drive unit 1 to the stationary portion 8 and the movable body 9 can be performed roughly in some extent, so that it is possible to reduce a labor required for the incorporation.

Further, before the linear motor drive unit 1 is incorporated to the movable body 9, since the top plate 4 fixed with the movable element 51 is mounted on the base plate 2 by the linear guides 3, 3, such a trouble that the movable element 51 is brought into contact with the magnet plate 50 can be prevented and, besides, such an accident that a hand is nipped between the movable element 51 and the magnet plate 50 can be prevented as well.

Figure 5:
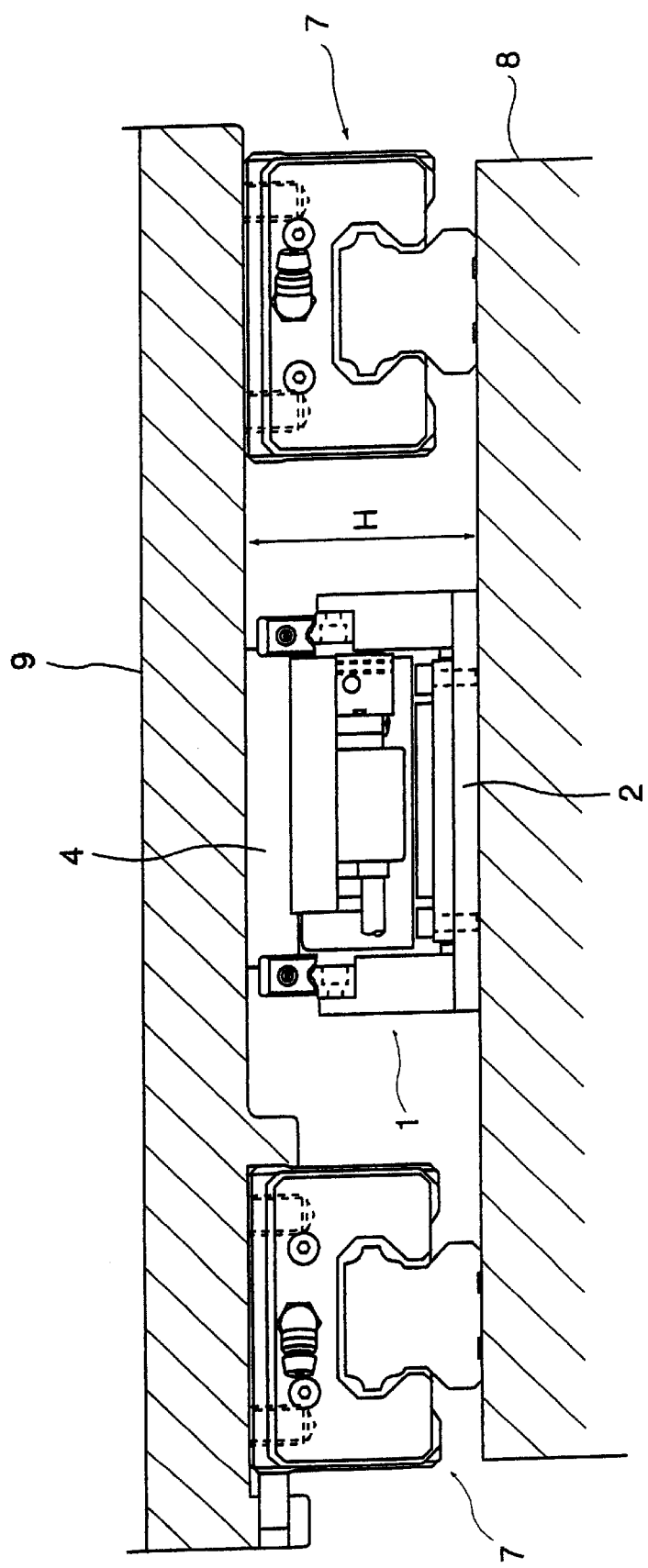
FIG. 5 is a front view showing a guide structure in which the linear motor drive unit according to the embodiment is used as drive means of a movable body.
Figure 6:
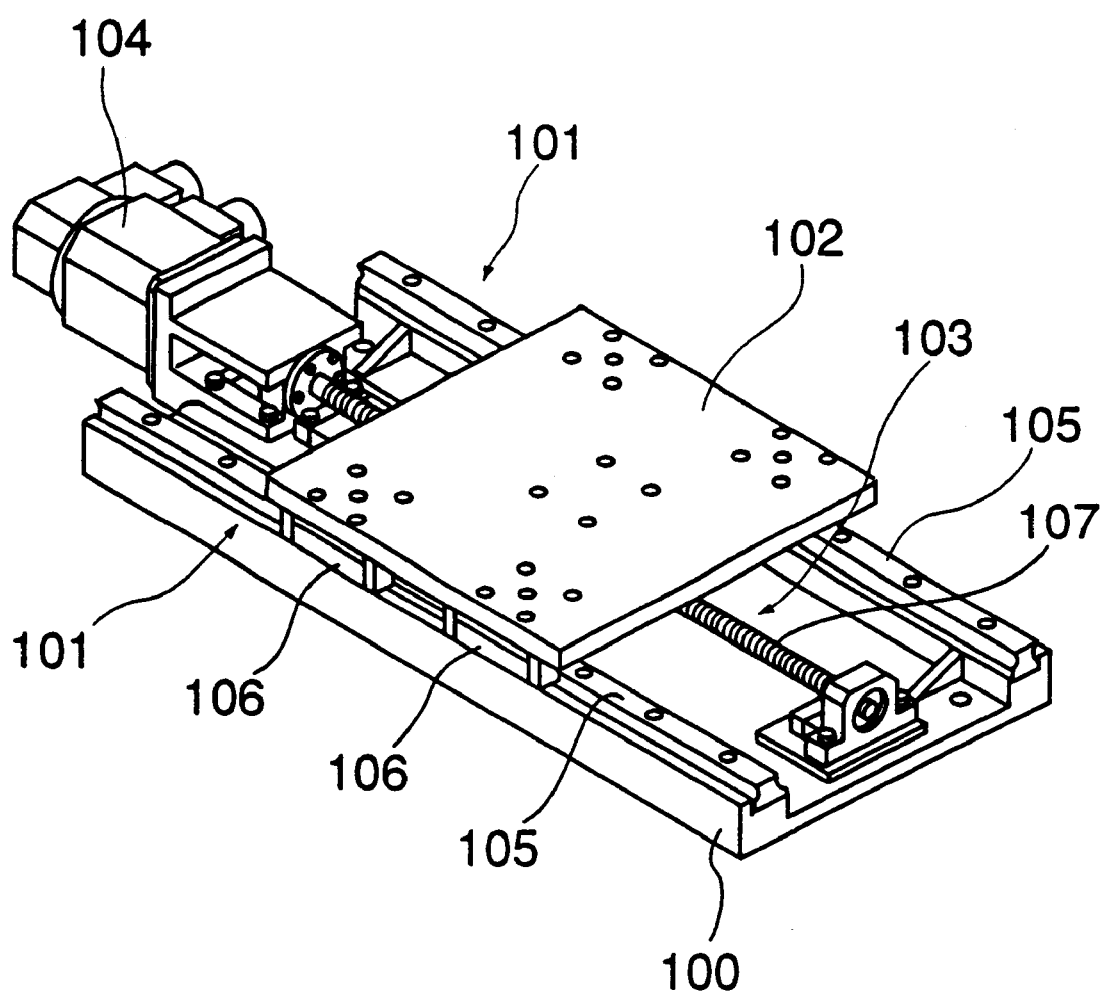
FIG. 6 is a perspective view showing one example of a conventional guide structure in which a rotary motor is used as drive means.

Additionally, according to the linear motor drive unit 1 of this embodiment, since also the top plate 4 itself fixed with the movable element 51 is supported on the base plate 2 by the linear guides 3, a vertically upward load (load in a direction reverse to F1) is not applied to the top plate 4 and, further if F1 is a very light load, it is also possible to construct a table guide structure by utilizing the top plate 4 itself as a movable body, even if the movable body 9 supported by the linear guides 7 as shown in FIG. 5 is not provided separately. Since an attraction force of the linear servomotor 5, i.e., a magnetic attraction force between the movable element 51 and the magnet plate 50, is applied between the top plate 4 and the base plate 2, this magnetic attraction force acts as a pre-load for pushing the slide member 31 to the track rail 30 and thus, so long as the vertically upward load applied to the top plate 4 does not exceed this pre-load, the top plate 4 is not separated from the base plate 2.

Further additionally, in the linear motor drive unit of this embodiment, since the magnet plate and the movable element constituting the linear servomotor is unitized through the linear bearings, and since the hall sensor and the linear encoder necessary for controlling the linear servomotor are integrated with the linear servomotor, if this linear motor drive unit is used when constructing a guide structure of the movable body, it becomes possible to construct easily and within a short time the guide structure having a feedback control function.

Incidentally, the linear guide 3 is not limited to one shown in FIG. 2 and FIG. 3 and, so long as it is one capable of bearing the vertically downward load F1 applied to the top plate 4, its constitution can be suitably changed. However, in case where the fact that it is used with the top plate 4 being fixed to the movable body 9 is taken into consideration, it is necessary that the linear guide 3 has no bearing ability as to a direction reverse to an action direction of the load F1 in order that an interval between the magnet plate 50 fixed to the base plate 2 and the movable element 51 fixed to the top plate 4 can be freely adjusted. For example, as another example of the linear guide 3, as shown in FIG. 7 there is considered one in which a guide shaft 70 extending along a moving direction of the movable body 9 is arranged on the standoff 20, while the movable body 9 is provided with rollers 71 travelling on the guide shaft 70.

Further, the linear motor provided between the top plate 4 and the base plate 2 is not limited to the linear servomotor 5, and it is also possible to use a linear motor of another type such as a linear pulse motor for instance.

What is claimed is:

1. A linear motor drive unit attached to a movable body linearly movable with respect to a stationary portion and used for the purpose of giving a thrust to the movable body, comprising:

a long base plate;

a magnet plate which is provided on the base plate, and in which plural magnetic poles are arranged at a predetermined pitch along a longitudinal direction of the base plate;

a top plate having a face for attaching the movable body;

a movable element fixed to the top plate and facing the magnet plate;

one pair of track rails provided on the base plate along both sides of the magnet plate; and slide members fixed to the top plate along both sides of the movable element and moving on the track rails while keeping an un-contact state between the movable element and the magnet plate;

characterized in that the track rails and the slide members are constituted so as to be able to freely divide in a direction along which the movable element is separated from the magnet plate.

2. A linear motor drive unit set forth in claim 1, characterized in that a linear encoder for detecting a movement distance of the top plate with respect to the base plate is provided.

3. A linear motor drive unit set forth in claim 1, characterized by having a Hall element for detecting a magnetic flux density between the magnet plate and the movable element.

* * * * *